United States Patent Office 2,802,885
Patented Aug. 13, 1957

2,802,885

STABILIZATION OF CHLORINATED HYDROCARBONS WITH 3,3-DIMETHOXY-2-METHYL-BUTAN-2-OL

Gordon E. Cole, Jr., Cos Cob, Conn., assignor to Air Reduction Company, Incorporated, New York, N. Y., a corporation of New York No Drawing. Application August 16, 1954, Serial No. 450,238

5 Claims. (Cl. 260—652.5)

This invention relates to the stabilization of chlorinated hydrocarbons. More particularly, it relates to the stabilization of chlorinated hydrocarbon solvents such as trichlorethylene and perchlorethylene.

The chlorinated hydrocarbons find wide commercial application as solvents for greases and other organic materials. For example, chlorinated hydrocarbons are used extensively in degreasing metallic articles, extracting caffein from coffee, and in dry cleaning. While chlorinated solvents are recognized to be of great value for these and other purposes, their use is accompanied by a serious drawback. It is known that when these chlorinated hydrocarbon solvents are exposed to heat, air, and light, they decompose with the formation of products, usually acidic materials, with objectionable characteristics. It is also known that this decomposition reaction is accelerated by the presence of metallic particles such as iron or aluminum. While the acidity developed is relatively small on a percentage basis, even relatively small amounts of acid substances can not be tolerated since the solvents normally are shipped in metallic containers and come into contact with metallic apparatus. In addition, the acidic materials are detrimental to fabrics and to many dyes. Furthermore, the amount of acid products present is cumulative since these solvents are used over and over again.

Many attempts have heretofore been made to either prevent the decomposition of chlorinated solvents or add chemical substances to such solvents to react with or neutralize the objectionable substances formed by the decomposition of such solvents. Since the chemical mechanism of this decomposition reaction is not definitely known, nor fully understood, the ability of a material to effectively stabilize chlorinated hydrocarbon solvents can only be established empirically.

It is an object of this invention to provide an effective stabilizer for chlorinated hydrocarbons, such as trichlorethylene and perchlorethylene, which is effective in small concentrations, and which does not develop an objectionable odor. Other objects will in part appear in, and in part be obvious from, the following detailed description.

It has now been discovered that the compound 3,3-dimethoxy-2-methyl-butan-2-ol, is particularly effective in stabilizing trichlorethylene and perchlorethylene. This compound may be represented by the structural formula

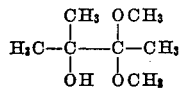

In general, the proportion of 3,3-dimethoxy-2-methyl-butan-2-ol added to the chlorinated solvent may range from as low as about 0.01 percent by weight to about 1.0 percent by weight. The amount of stabilizer added will depend upon the particular solvent to be stabilized, the intended use of the solvent composition, and the degree of stability desired.

For many applications it may be desirable to combine the 3,3-dimethoxy-2-methyl-butan-2-ol with other stabilizers. For example, it may be admixed with alkaline-reacting materials, such as inorganic alkaline-earth oxides, e. g., calcium carbonate, or organic amines, e. g., pyridine or triethylamine; phenolic materials such as thymol, resorcinol, catechol or p-tert.butylphenol; unsaturated materials such as diisobutylene; and pyrroles such as N-methyl pyrrole and pyrrole.

While the use of 3,3-dimethoxy-2-methyl-butan-2-ol is most effective with trichlorethylene and perchlorethylene, it may also be used to stabilize other chlorohydrocarbons such as methylene chloride, chloroform, methyl chloroform, ethylene dichloride, trichlorethane, vinylidine chloride, vinyl chloride, and others.

The stabilizer of this invention, 3,3-dimethoxy-2-methyl-butan-2-ol, may be prepared by reacting 3-methyl-1-butyn-3-ol with methyl alcohol in the presence of a catalytic mixture comprising red mercuric oxide, boron fluoride-ether, methyl alcohol and trichloracetic acid, in accordance with the procedure more fully described in the article by I. F. Froning and G. F. Hennion in the Journal of the American Chemical Society, vol. 62, pp. 653-655 (1940).

The process of stabilization comprises admixing a small but stabilizing amount, for instance 0.01 to 1.0 percent by weight, of 3,3-dimethoxy-2-methyl-butan-2-ol with the chlorinated hydrocarbon solvent. For example, a stabilized mixture of trichlorethylene may be made up by adding 0.1 percent by weight of 3,3-dimethoxy-2-methyl-butan-2-ol to said trichlorethylene.

The following example will illustrate the degree of stabilization obtainable with 3,3-dimethoxy-2-methyl-butan-2-ol.

Example I

A solution of water purified perchlorethylene (150 ml.) containing 0.1 percent by weight of 3,3-dimethoxy-2-methyl-butan-2-ol and 0.4 ml. of diisobutylene was refluxed for 111 hours with 1.6 gms. of aluminum turnings in the boiler compartment and vapor condensate section. After reflux was discontinued, the perchlorethylene was extracted and portions thereof were analyzed for $H^+$, $Cl^-$, and $Al^{+++}$ content. The following results were obtained:

| Ion | Number of Moles $\times 10^3$ |
|---|---|
| $H^+$ | 2.198 |
| $Cl^-$ | 0.72 |
| $Al^{+++}$ | 0.059 |

It was observed that there was no apparent attack of the aluminum turnings.

The term "stabilize," in its various forms as used in the foregoing specification and the appended claims, is intended to refer to the inhibition of the decomposition reaction and/or the neutralization of any deleterious decomposition products.

What is claimed is:

1. A composition of matter comprising a chlorinated hydrocarbon solvent selected from the group consisting of trichlorethylene and perchlorethylene and between about 0.01 percent to about 0.1 percent by weight of 3,3-dimethoxy-2-methyl-butan-2-ol.

2. A composition of matter comprising trichlorethylene and between about 0.01 percent to about 0.1 percent by weight of 3,3-dimethoxy-2-methyl-butan-2-ol.

3. A composition of matter comprising perchlorethylene and between about 0.01 percent to about 0.1 percent by weight of 3,3-dimethoxy-2-methyl-butan-2-ol.

4. The process for stabilizing trichlorethylene which comprises admixing from about 0.01 percent to about 0.1 percent by weight of 3,3-dimethoxy-2-methyl-butan-2-ol with said trichlorethylene.

5. The process for stabilizing perchlorethylene which comprises admixing from about 0.01 percent to about 0.1 percent by weight of 3,3-dimethoxy-2-methyl-butan-2-ol with said perchlorethylene.

References Cited in the file of this patent
UNITED STATES PATENTS 2,371,645    Petering et al. _____ Mar. 20, 1945